United States Patent
Itoh et al.

(10) Patent No.: US 8,052,280 B2
(45) Date of Patent: Nov. 8, 2011

(54) LASER DISPLAY DEVICE BRANCHING A MODULATED LASER BEAM THAT SCANS BOTH BEAMS TO THE SAME POSITION AT THE SAME TIME ON A SCREEN

(75) Inventors: Tatsuo Itoh, Osaka (JP); Kazuhisa Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 355 days.

(21) Appl. No.: 12/375,293

(22) PCT Filed: Oct. 10, 2007

(86) PCT No.: PCT/JP2007/069763
§ 371 (c)(1),
(2), (4) Date: Jan. 27, 2009

(87) PCT Pub. No.: WO2008/044709
PCT Pub. Date: Apr. 17, 2008

(65) Prior Publication Data
US 2009/0231550 A1    Sep. 17, 2009

(30) Foreign Application Priority Data
Oct. 11, 2006  (JP) .................................. 2006-277533

(51) Int. Cl.
*G03B 21/28* (2006.01)
*H01J 3/14* (2006.01)
(52) U.S. Cl. ......................................... 353/37; 250/234
(58) Field of Classification Search .................... 353/37,
353/31, 30, 34, 85–87, 94, 98, 99, 50, 121,
353/122; 250/578.1, 234–236; 359/246,
359/636, 238, 298, 301, 302; 348/744, 739,
348/745–747, 756
See application file for complete search history.

(56) References Cited

U.S. PATENT DOCUMENTS

| | | | |
|---|---|---|---|
| 3,652,956 A * | 3/1972 | Pinnow et al. | 359/278 |
| 3,762,791 A * | 10/1973 | Fournier et al. | 359/201.1 |
| 6,351,324 B1 * | 2/2002 | Flint | 359/202.1 |
| 6,538,705 B1 | 3/2003 | Higurashi et al. | |
| 6,956,878 B1 | 10/2005 | Trisnadi | |

(Continued)

FOREIGN PATENT DOCUMENTS
FR  2460081  * 2/1981
(Continued)

OTHER PUBLICATIONS

International Search Report issued Dec. 25, 2007 in the International (PCT) Application No. PCT/JP2007/069763.

(Continued)

*Primary Examiner* — Que T Le
*Assistant Examiner* — Jennifer Bennett
(74) *Attorney, Agent, or Firm* — Wenderoth, Lind & Ponack, L.L.P.

(57) ABSTRACT

A laser display device, which is capable of ensuring the safety of a person's eyes and reducing speckle noise even when a screen is arranged at an arbitrary position, includes a laser light source emitting a laser light, a modulator modulating the laser light and emitting a modulated light, and a branching unit branching the modulated light into a plurality of branched lights. Further, at least two of the plurality of branched lights reach same positions on a screen at substantially same timings.

15 Claims, 10 Drawing Sheets

U.S. PATENT DOCUMENTS

| | | |
|---|---|---|
| 7,144,117 B2 | 12/2006 | Kojima |
| 7,193,765 B2 * | 3/2007 | Christensen et al. .......... 359/279 |
| 7,255,445 B2 | 8/2007 | Kojima |
| 7,283,308 B2 * | 10/2007 | Cossairt et al. ............... 359/649 |
| 2004/0109219 A1 | 6/2004 | Kikuchi |
| 2004/0257664 A1 * | 12/2004 | Hashimoto et al. ........... 359/636 |
| 2005/0035943 A1 | 2/2005 | Kojima |
| 2005/0110954 A1 | 5/2005 | Kojima |
| 2007/0081220 A1 * | 4/2007 | Yokoyama et al. ........... 359/216 |
| 2008/0172197 A1 * | 7/2008 | Skipor et al. .................... 702/82 |
| 2008/0297731 A1 * | 12/2008 | Powell et al. .................... 353/37 |

FOREIGN PATENT DOCUMENTS

| | | |
|---|---|---|
| JP | 2000310748 A * | 11/2000 |
| JP | 2003-521740 | 7/2003 |
| JP | 2004-45684 | 2/2004 |
| JP | 2004-151133 | 5/2004 |
| JP | 2005-10616 | 1/2005 |
| JP | 2005010616 A * | 1/2005 |
| JP | 2005-31526 | 2/2005 |
| JP | 2005-31529 | 2/2005 |
| JP | 2005-352172 | 12/2005 |

OTHER PUBLICATIONS

Extended European Search Report issued Jun. 20, 2011 in European Patent Application No. 07 82 9501, which is a foreign counterpart of the present application.

* cited by examiner

LASER DISPLAY DEVICE BRANCHING A MODULATED LASER BEAM THAT SCANS BOTH BEAMS TO THE SAME POSITION AT THE SAME TIME ON A SCREEN

FIELD OF TECHNOLOGY

The present invention relates to a laser display device realizing high luminance using a laser light as a light source, having a wide color reproduction range and considering the safety of eyes.

BACKGROUND ART

In recent years, laser display devices using laser lights as light sources have been brought to attention as high-luminance laser display devices taking advantage of monochromaticity and high luminance of laser lights and having wide color reproduction ranges.

However, measures for the safety of eyes, for example, by devising the construction of an optical system for introducing a laser light as a light source to a screen are necessary in the case of a laser display device having such excellent properties. It is also necessary to reduce speckle noise produced due to high monochromaticity of laser lights.

There has been illustrated a projection type image display device constructed to be able to ensure the safety of eyes and brighten display images (see, for example, patent literature 1). This projection type image display device includes a projector means for projecting an image on a screen for image display by scanning laser lights, wherein the laser lights includes a plurality of laser beams R1 (red laser 1), G (green laser), B (blue laser) and R2 (red laser 2). These plurality of laser beams R1, G, B and R2 are irradiated with time differences substantially to the same positions of the screen by the projector means of the display device, and the safety of eyes is ensured by reducing the intensities of the laser beams projected substantially to the same positions. Further, image signals to be applied to the respective laser beams R1, G, B and R2 have time differences in conformity with the time differences of irradiation so that the preceding laser beam delays relative to the succeeding laser beam. By doing so, the intensities of the laser beams irradiated to the substantially same positions are increased to normal intensities within a specified time range, whereby a displayed image is brightened.

There has been also disclosed an example in which scanned beams of light LR (red laser light), LG (green laser light), LB (blue laser light) respectively have intensities equal to or below a specified value and have spatial intervals of a specified distance or longer from each other in any of planes at an observer side, whereby the safety of eyes is ensured (see, for example, patent literature 2). By doing so, a plurality of beams of light are prevented from being concentrated substantially at same positions to ensure the safety of eyes.

However, in the above conventional image display device or image display method, the construction of the optical system to ensure the safety of eyes and the like are disclosed, but a construction or a method for simultaneously solving the problem of speckle noise produced upon using a laser light is not disclosed. Further, there is clearly disclosed no specific solution for problems concerning the ensuring of the safety of eyes and the reduction of speckle noise in the case where a screen is arranged at an arbitrary position.

Patent Literature 1:
  Japanese Unexamined Patent Publication No. 2005-31529
Patent Literature 2:
  Japanese Unexamined Patent Publication No. 2005-10616

DISCLOSURE OF THE INVENTION

An object of the present invention is to provide a laser display device capable of ensuring the safety of eyes and reducing speckle noise even if a screen is arranged at an arbitrary position.

One aspect of the present invention is directed to a laser display device, comprising a laser light source for emitting a laser light; a modulator for modulating the laser light emitted from the laser light source and emitting a modulated light; a branching unit for branching the modulated light emitted from the modulator into at least two branched lights; and an optical path setting unit for setting optical paths of the at least two branched lights so that the at least two branched lights propagate toward a screen, wherein the optical path setting unit causes the at least two branched lights to reach substantially the same positions on the screen substantially at the same timings.

In the above laser display device, a modulated light emitted from the modulator is branched into at least two branched lights, the optical paths of the at least two branched lights are set such that the at least two branched lights propagate toward the screen, and the at least two branched lights reach substantially the same positions on the screen substantially at the same timings. Thus, an image having speckle noise reduced can be displayed on the screen arranged at an arbitrary position. Further, since optical axes of the branched lights differ from each other, the safety of eyes can be more reliably ensured regardless of at which position in an emission direction of the laser light the laser light is seen.

According to the laser display device of the present invention, a thin display device with a wide color reproduction range, a large area and a high image quality can be realized since a laser light source with high luminance and strong monochromaticity is used. Further, the laser display device of the present invention can display an image having speckle noise reduced on the screen arranged at an arbitrary position and has a profound effect of more reliably ensuring the safety of eyes regardless of at which position in the emission direction of the laser light the laser light is seen.

BEST EMBODIMENTS FOR EMBODYING THE INVENTION

Figure 1A:
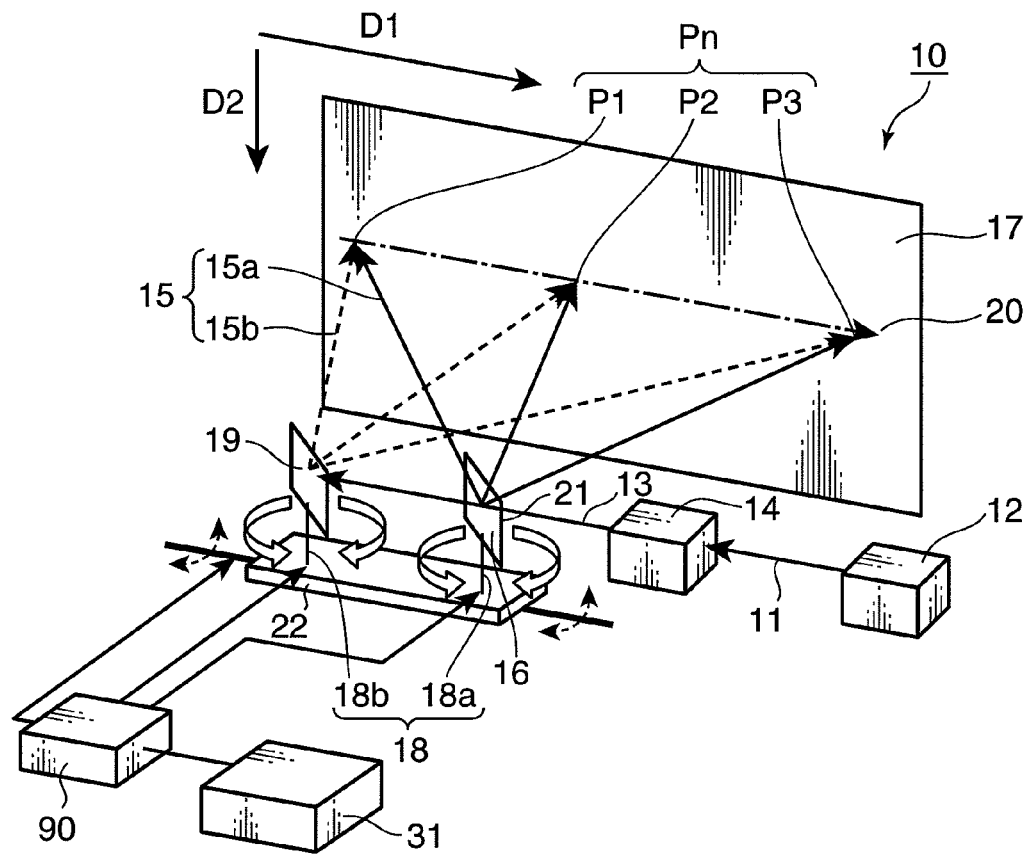
FIG. 1A is a schematic perspective view showing an essential part of a laser display device according to a first embodiment of the invention.

Hereinafter, embodiments of the invention are described with reference to the drawings. It should be noted that same elements are identified by same reference numerals and description may not be repeatedly made in some cases. The drawings mainly diagrammatically show the respective constituent elements for easier understanding, and the shapes and the like are not precisely shown.

First Embodiment

Figure 1B:
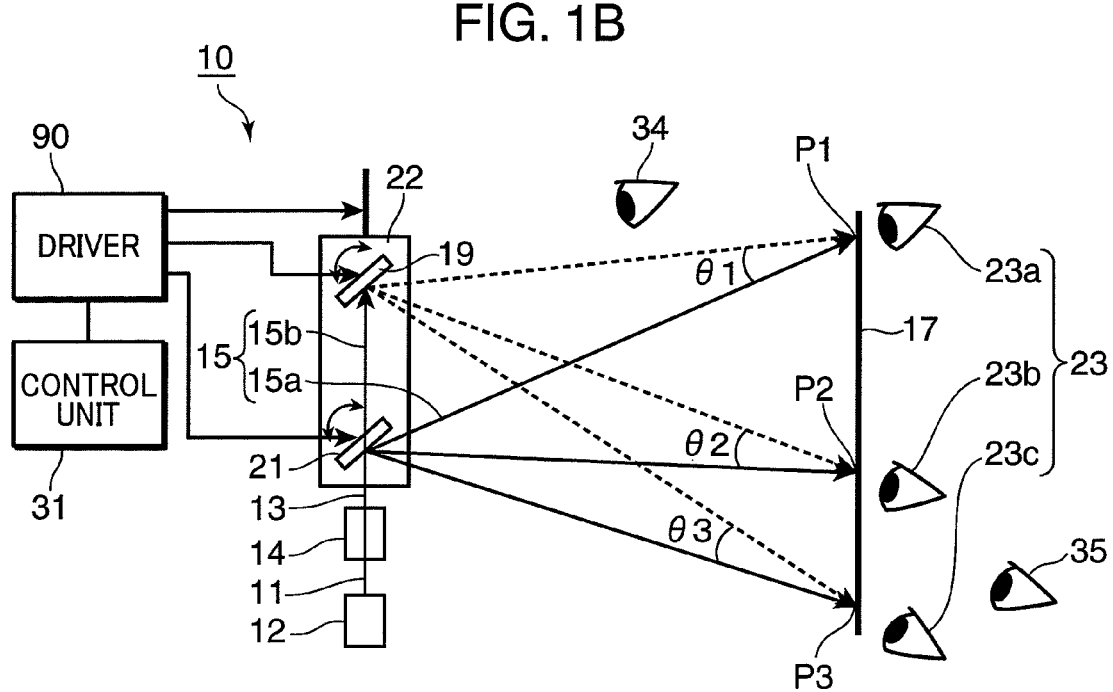
FIG. 1B is a schematic construction diagram of the laser display device of FIG. 1A when viewed from above.

FIG. 1A is a schematic perspective view showing an essential part of a laser display device according to a first embodiment of the invention, and FIG. 1B is a schematic construction diagram of the laser display device of FIG. 1A when viewed from above.

A laser display device 10 according to this embodiment is, as shown in FIG. 1A, provided with a laser light source 12 for emitting a laser light 11, a modulator 14 for modulating the laser light 11 emitted from the laser light source 12 and emitting a modulated light 13 and a branching unit 16 for branching the modulated light 13 into a plurality of branched lights 15. Out of the plurality of branched lights 15 branched by the branching unit 16, at least two branched lights 15a, 15b reach substantially the same display positions Pn on a screen 17 substantially at the same timings. Specifically, the modulated light 13 emitted from the modulator 14 is branched into two branched lights 15a, 15b after being incident on the branching unit 16. The branched light 15a directly propagates toward the display position Pn on the screen 17 from the branching unit 16, whereas the branched light 15b propagates toward a mirror 19 from the branching unit 16 and then propagates toward the display position Pn on the screen 17 after being reflected by the mirror 19. In other words, the two branched lights 15a, 15b reach the same display position Pn by way of different paths.

The laser display device 10 according to this embodiment is further provided with a plurality of scanning units 18 for respectively scanning the plurality of branched lights 15 as shown in FIG. 1A. The first scanning unit 18a scans the branched light 15a (hereinafter, "first branched light 15a"), and the second scanning unit 18b scans the branched light 15b (hereinafter, "second branched light 15b") in association with the scanning of the first branched light 15a by the first scanning unit 18a. As a result, the first branched light 15a and the second branched light 15b are scanned at the same positions Pn on the screen 17 at the same timings.

The branching unit 16 of this embodiment includes a half mirror 21 as shown in FIG. 1A. The modulated light 13 is incident on the half mirror 21 of the branching unit 16, thereby being branched into the first and second branched lights 15a, 15b. The first branched light 15a reflected by the branching unit 16 and the second branched light 15b propagating through the half mirror 21 of the branching unit 16 and reflected by the mirror 19 are scanned at the same display positions Pn on the screen 17 at the same timings in an order of P1→P2→P3 along a horizontal direction D1 shown by an arrow 20.

As shown in FIG. 1A, the first scanning unit 18a of this embodiment scans the first branched light 15a in the horizontal direction D1 on the screen 17 by rotating the half mirror 21 of the branching unit 16. On the other hand, the second scanning unit 18b of this embodiment scans the second branched light 15b in the horizontal direction D1 on the screen 17 by rotating the mirror 19. The first and second scanning units 18a, 18b are both connected to a driver 90, and rotate the half mirror 21 and the mirror 19 in accordance with commands from the driver 90. A control unit 31 obtains the position of the screen 17 and the display positions Pn of the first and second branched lights 15a, 15b on the screen 17 moving by the scanning of the first and second scanning units 18a, 18b, and manages commands outputted from the driver 90 to the first and second scanning units 18a, 18b based on these obtained positions.

In the laser display device 10 according to this embodiment, the movements of the half mirror 21 and the mirror 19 are associated by associating the scanning of the first branched light 15a by the first scanning unit 18a and the scanning of the second branched light 15b by the second scanning unit 18b, whereby the first and second branched lights 15a, 15b reach the same display positions Pn on the screen 17 at the same timings.

Here, that the first and second branched lights 15a, 15b reach a pixel at the same display position Pn at the same timing means that the first and second branched lights 15a, 15b reach the display position Pn of this pixel within the range of a scanning time allotted to this pixel.

The scanning units 18 (first and second scanning units 18a, 18b) of this embodiment are united with a display position controller 22. The display position controller 22 is connected to the driver 90 and rotates in accordance with a command from the driver 90 as shown in FIG. 1A. The control unit 31 manages commands outputted from the driver 90 to the display position controller 22 in addition to those outputted from the driver 90 to the first and second scanning units 18a, 18b. Thus, the movements of the first and second scanning units 18a, 18b can be associated not only in the horizontal direction D1, but also in a vertical direction D2, whereby the plurality of branched lights 15 can be scanned at all the positions on the screen 17.

A feature of the laser display device 10 according to this embodiment is that the safety of user's eyes to the branched lights 15 is ensured so as not to affect the user's eyes even if the branched lights 15 are directly incident on the user's eyes. This point is described below. First of all, a case where the user's eyes are located near an optical path of the branched light 15 propagating toward the screen 17 (position 34 in FIG. 1B) or a case where the user's eyes are located at a distant position from the back surface of the screen 17 (position 35 in FIG. 1B) is described. In these cases, there is no likelihood that a plurality of branched lights 15 are simultaneously incident on the user's eyes.

FIG. 1B shows a schematic construction of the laser display device 10 of FIG. 1A when viewed from above. The laser light 11 emitted from the laser light source 12 is emitted as the modulated light 13 from the modulator 14 after being modulated, for example, by an image signal. The modulated light 13 is branched into a plurality of branched lights 15, for example, by the branching unit 16 of FIG. 1A so that the light quantities of the respective branched lights 15 do not damage the retinas of eyes. In other words, in this embodiment, the light quantity of one laser beam irradiated toward the screen 17 is reduced by branching one modulated light 13 into a plurality of branched lights 15. Therefore, the light quantity in the case where one laser beam is directly incident on the user's eyes is reduced, thereby reducing effect on the user's eyes.

On the other hand, in FIG. 1B, the modulated light 13 is branched by the half mirror 21 into the first and second branched lights 15a, 15b, which reach the same display positions Pn on the screen 17. Accordingly, the light quantity of the modulated light 13 at the display positions Pn on the screen 17 is substantially the same as the one before being branched. In other words, in this embodiment, one modulated light 13 emitted from the modulator 14 is branched into two branched lights 15a, 15b (first and second branched lights 15a, 15b) and the first and second branched lights 15a, 15b are condensed to the same display positions Pn on the screen 17 by way of different optical paths. Therefore, an image can be displayed at the display positions Pn on the screen 17 with the same brightness as in the case of directly irradiating one modulated light 13.

Next, a case where the user's eyes are located at positions 23 (23a, 23b and 23c) of FIG. 1B is described. In this case, the position of the user's eyes is located near the display position Pn on the screen 17 and a plurality of branched lights 15 reaching the display position Pn are simultaneously incident on the user's eyes. As a result, the same light quantity as that of the modulated light 13 is directly incident on the user's eyes. The plurality of branched lights 15 incident on the user's eyes are condensed to one point on the retina by a lens of each eye, thereby having much effect on the retinas of the user's eyes.

Accordingly, in the laser display device 10 according to this embodiment, angles θ1, θ2 and θ3 formed at the display positions (P1, P2, P3, etc.) by arbitrary two branched lights, e.g. the first and second branched lights 15a, 15b here out of the plurality of branched lights 15 are set equal to or larger than 1.5 milliradians and smaller than π radian (180°). By setting such angles, even if the plurality of branched lights 15 are simultaneously incident on the pupils of the user's eyes, it can be avoided that the plurality of branched lights 15 are condensed to one point on the retina of each eye. Specifically, there is no likelihood that the first and second branched lights 15a, 15b incident on the user's eyes by the above angles are not condensed to one point on the retina of each eye. As a result, even if the position of the user's eyes is located near the display position Pn on the screen 17 and the plurality of branched lights 15 are simultaneously incident on the user's eyes, there is no likelihood of giving much effect on the retinas of the user's eyes and the safety of eyes can be more reliably ensured.

Accordingly, if an angle formed by arbitrary two branched lights 15 at the display position Pn is equal to or larger than 1.5 milliradians and smaller than π radian, the safety of the pupils of eyes can be ensured. Specifically, even if the modulated light 13 is branched into branched lights 15 having light quantities safe even upon being incident on the eyes and these branched lights 15 reach the screen 17, the safety of eyes can be ensured regardless of at which position the user's eyes are located. In other words, the safety of the user's eyes can be ensured even if the user's eyes are located at the position 34 closer to the display position controller 22 for the branched lights 15 than the screen 17, even if the user's eyes are located at the position 35 distant from the back surface of the screen 17 or even if the user's eyes are located at the position 23 near the display position Pn on the screen 17 in FIG. 1B, i.e. regardless of at which position the user's eyes are located.

In this embodiment, by setting the angle formed by two branched lights 15 equal to or larger than 100 milliradians and smaller than π radian, effect on the user's eyes can be suppressed even if exposure to a plurality of branched lights 15 continues for a long time.

Further, since the laser display device 10 according to this embodiment is of the scan type, the light quantities of the respective branched lights 15 are preferably suppressed to below 1 mW.

Since the modulated light 13 is branched into the plurality of branched lights 15, which reach the same display positions Pn on the screen 17, there are optical path differences between the plurality of branched lights at most of the display positions Pn. As a result, the speckle noise of a video scanned on the entire screen 17 can be reduced. The speckle noise can be reduced by adding and averaging speckle noises produced by the plurality of branched lights. Thus, by employing such a construction, scanning is made on the screen 17 without changing the light quantity of the initial modulated light 13, whereby the laser display device 10 capable of reducing the speckle noise and displaying a video with high safety to eyes can be realized. The speckle noise can be also reduced by vibrating the display position controller 22 and the first and second scanning units 18a, 18b to temporally change the respective optical paths of the branched lights 15. In this case, the first scanning unit 18a, the second scanning unit 18b or the display position controller 22 may be provided with a mechanism for finely vibrating them in vertical or lateral directions and may be finely vibrated in accordance with a command from the driver 90.

Second Embodiment

Figure 2:
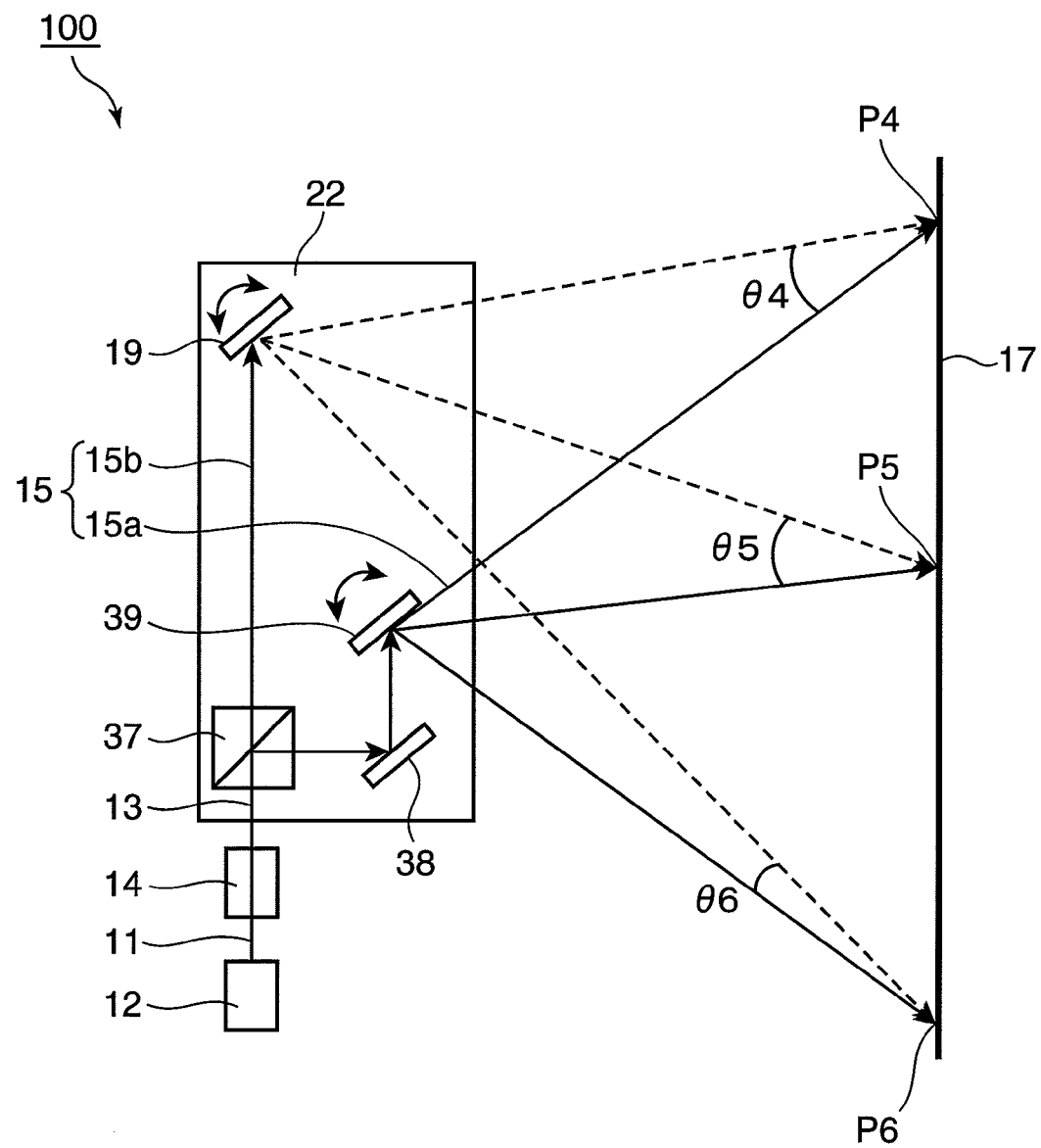
FIG. 2 is a schematic diagram of a laser display device according to a second embodiment of the invention when viewed from above.

Next, a second embodiment of the present invention is described. FIG. 2 is a schematic construction diagram of a laser display device according to the second embodiment of the present invention when viewed from above. In FIG. 2, the control unit 31 and the driver 90 shown in FIGS. 1A and 1B are not shown in order to simplify the drawing. Of course, a laser display device 100 according to this embodiment may also be provided with the control unit 31 and the driver 90 of the first embodiment.

The laser display device 10 according to the first embodiment shown in FIGS. 1A and 1B has a construction employed in the case where a distance between the display position controller 22 and the screen 17 is longer than about 2 m and the screen size is equal to or below 100 inches. In this case, an operation can be performed with an angle of about 45° between the half mirror 21 and the modulated light 13, wherefore there is no large difference between the light quantities of the branched lights 15a, 15b even if the modulated light 13 is branched into two branched lights 15a, 15b.

However, if the distance between the display position controller 22 and the screen 17 is below 2 m or the screen size exceeds 100 inches, the angle of the half mirror 21 largely deviates from 45°. Thus, a ratio of the respective light quantities of the two branched lights 15a, 15b may deviate from 10:1. In other words, if the above distance or size is reached, the modulated light is incident substantially in parallel with the half mirror 21 in some cases. In such cases, the amount of the light transmitting through the half mirror 21, i.e. the branched light 15b is reduced. As a result, a light quantity difference between the branched lights 15a and 15b becomes very large.

Accordingly, this embodiment is so constructed as to be able to branch the modulated light 13 without causing a large light quantity difference between the two branched lights 15a, 15b even if the distance between the display position controller 22 and the screen 17 is below 2 m or the screen size exceeds 100 inches.

In the laser display device 100 according to this embodiment, a laser light 11 from a laser light source 12 is inputted to a modulator 14 and a modulated light 13 outputted from the modulator 14 can be branched into two branched lights 15a, 15b having substantially the same light quantity by a fixed beam splitter 37 as shown in FIG. 2. In other words, the first branched light 15a is reflected by a fixed mirror 38 and scanned by a mirror 39. The second branched light 15b is scanned by a mirror 19. The two branched lights 15a, 15b are so scanned as to reach the same display positions P4, P5 and P6 of a screen 17 at the same timings. Specifically, in this embodiment, the modulated light 13 is incident on the beam splitter 37 to be branched into the first and second branched lights 15a, 15b having the same light quantity beforehand. Thus, even if an angle of the mirror 39 increases, there is no likelihood of producing a large light quantity difference between the first and second branched lights 15a, 15b.

According to this embodiment, there can be realized the laser display device 100 capable of reducing the speckle noise and displaying a video with high safety to eyes by the scanning on the screen 17 without changing the light quantity of the initial modulated light 13.

Also in the laser display device 100 according to this embodiment, two scanning units may be provided to rotate the mirrors 19, 39 and may rotate the mirrors 19, 39 in accordance with commands from a driver.

Third Embodiment

Figure 3:
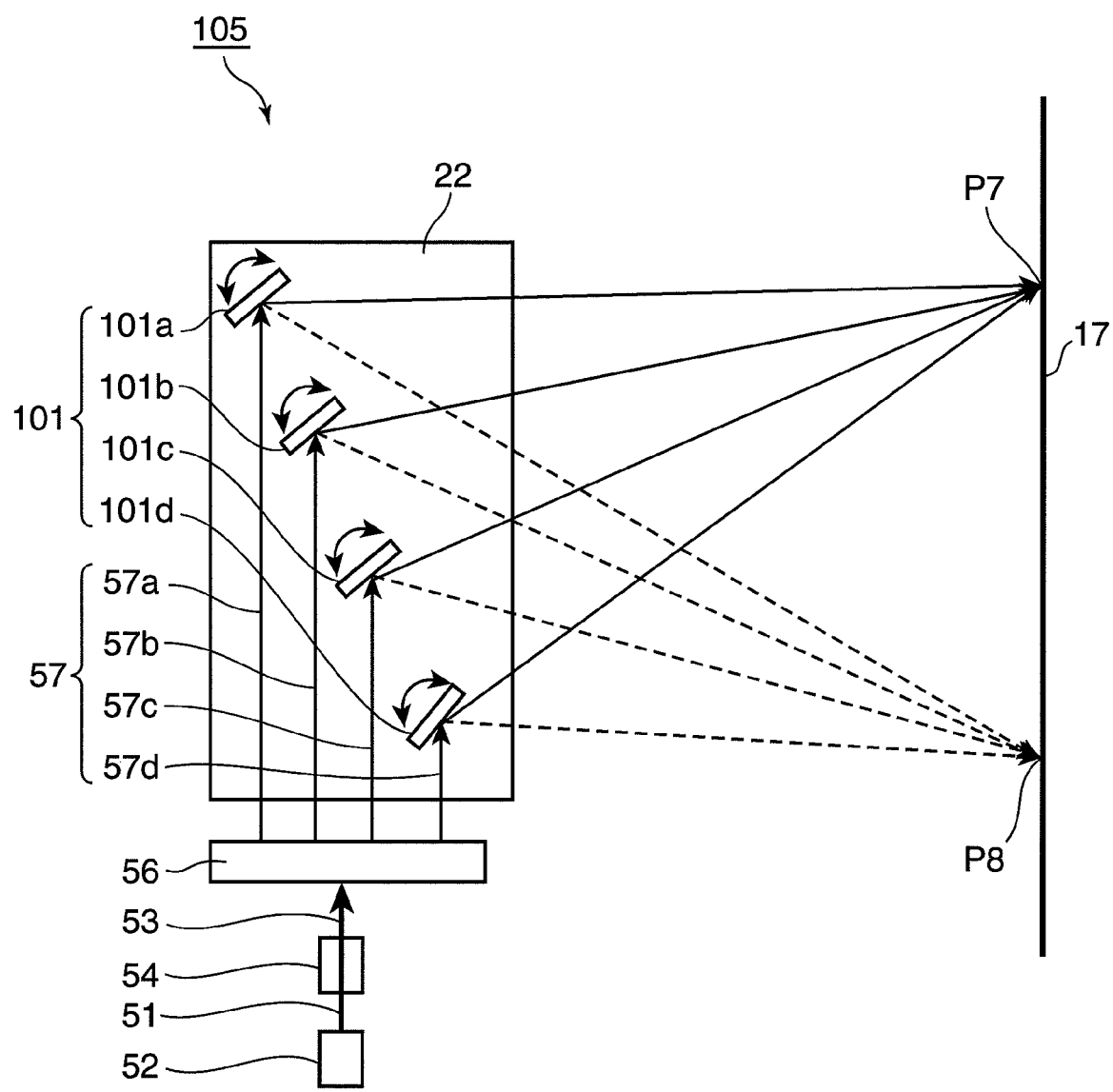
FIG. 3 is a schematic diagram of a laser display device according to a third embodiment of the invention when viewed from above.

Next, a third embodiment of the present invention is described. FIG. 3 is a schematic construction diagram of a laser display device according to the third embodiment of the present invention when viewed from above. In FIG. 3, the control unit 31 and the driver 90 shown in FIGS. 1A and 1B are not shown in order to simplify the drawing. Of course, a laser display device 105 according to this embodiment may also be provided with the control unit 31 and the driver 90 of the first embodiment.

The laser display device 105 according to this embodiment uses a laser light source with a large light output unlike the laser display device 10 according to the first embodiment. In this embodiment, the number of branched lights to be condensed to the same display positions can be increased by using the high-output laser light source, whereby a brighter image can be displayed.

In the laser display device 105 according to this embodiment, a laser light 51 is emitted from a high-output laser light source 52 as shown in FIG. 3. A laser light 51 with a large output is modulated and emitted as a modulated light 53 from a modulator 54. The modulated light 53 is branched into a plurality of branched lights 57 having the same light quantity, for example, by a branching filter 56 formed by an optical block comprised of a combination of half mirrors or a fiber. The respective branched lights 57a, 57b, 57c and 57d are scanned by mirrors 101a, 101b, 101c and 101d to reach the same display positions P7, P8 on a screen 17 at the same timings. Although an example of branching into four branched lights 57 is illustrated in FIG. 3, the modulated light may be branched into more branched lights.

According to this embodiment, there can be realized the laser display device 105 capable of reducing the speckle noise and displaying a video with high safety to eyes by the scanning on the screen 17 without changing the light quantity of the initial modulated light 53.

Also in the laser display device 105 according to this embodiment, a plurality of scanning units may be provided to rotate a plurality of mirrors 101 and may rotate the respective mirrors 101 in accordance with commands from a driver.

Fourth Embodiment

Figure 4A:
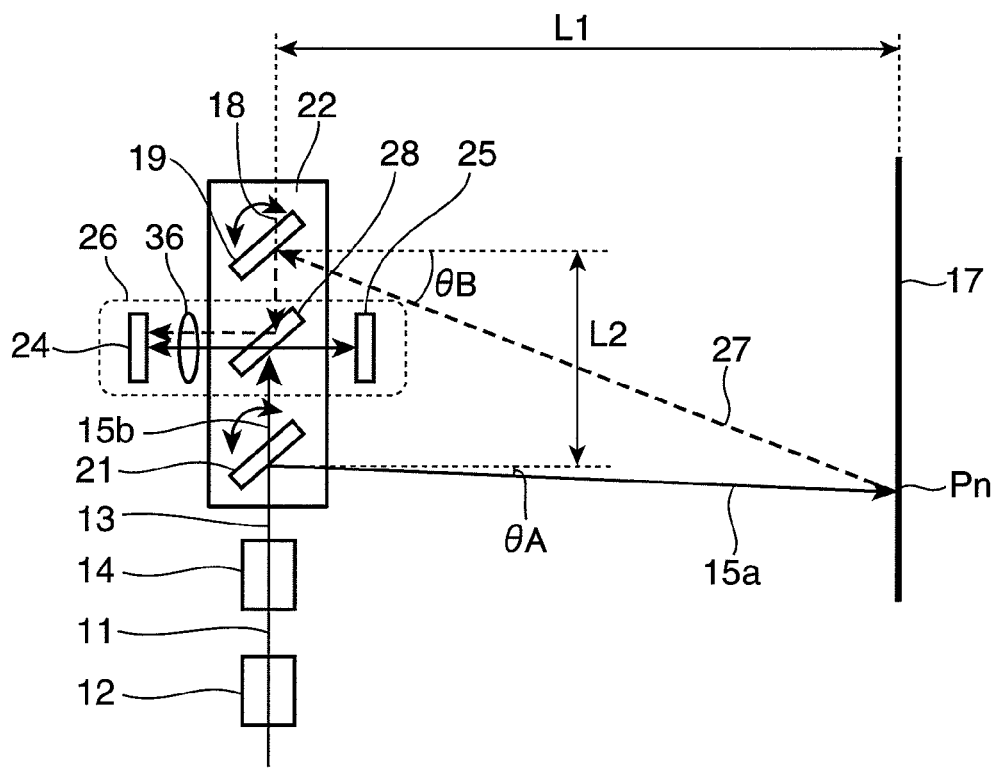
FIG. 4A is a schematic diagram of a laser display device according to a fourth embodiment of the invention when viewed from above.
Figure 4B:
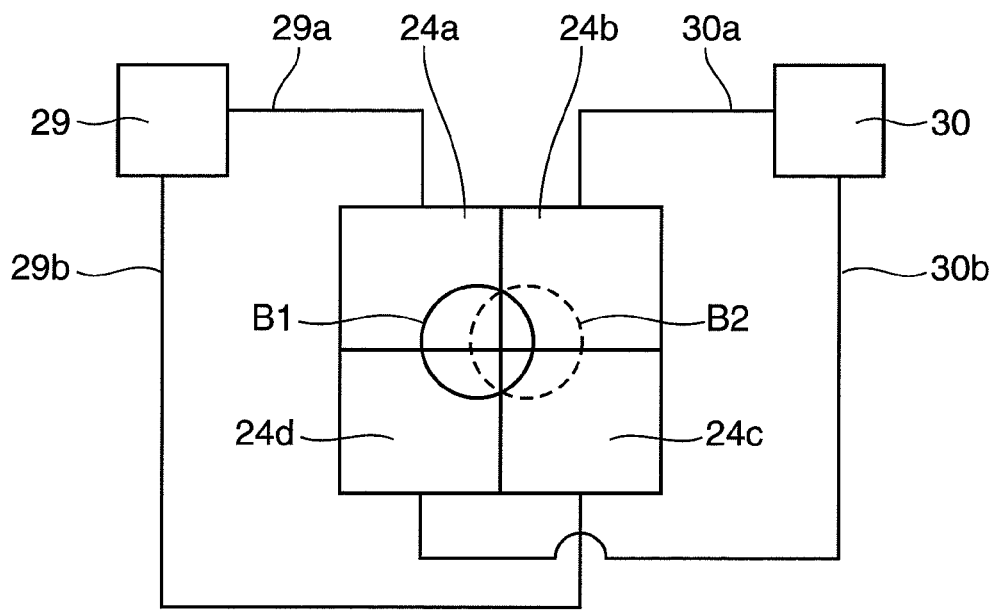
FIG. 4B is a construction diagram of a sensor for detecting laser lights.

Next, a fourth embodiment of the present invention is described. FIG. 4A is a schematic construction diagram of a laser display device according to the fourth embodiment of the present invention when viewed from above. This embodiment relates to a laser display device including a detection system capable of detecting a distance between a scanning unit and a screen and adapted to superimpose a plurality of spots on the screen. FIG. 4B is a construction diagram of a sensor for detecting a laser light. In FIG. 4A, the control unit 31 and the driver 90 shown in FIGS. 1A and 1B are not shown in order to simplify the drawing. Of course, the laser display device according to this embodiment may also be provided with the control unit 31 and the driver 90 of the first embodiment.

The laser display device according to this embodiment is further provided with an optical system 26 including a sensor 24 for detecting a laser light 11 and a reflection mirror 25 for reflecting the laser light 11 in addition to the construction of the laser display device 10 of the above first embodiment as shown in FIG. 4A. In this embodiment, a diffused light 27 obtained by diffusing the branched light 15a, out of a plurality of branched lights 15 branched by a half mirror 21, by a diffusing surface of the screen 17 and the branched light 15b are introduced to the optical system 26 and the outputs of the sensor 24 are compared, whereby a distance L1 between the scanning unit 18 and the screen 17 can be detected.

A procedure of detecting the distance L1 between the scanning unit 18 and the screen 17 is described below. In FIG. 4A, the branched light 15a propagates from the half mirror 21 toward the screen 17 at an angle θA to a vertical direction of the screen 17 and is diffused by the diffusing surface of the screen 17 at a position Pn on the screen 17. At this time, the half mirror 21 is scanned such that the angle θA approximates to 0° as much as possible. The diffused light 27 diffused at the position Pn is reflected after being incident on the mirror 19 at an angle θB, and reflected by the half mirror 28 to be incident on the sensor 24.

On the other hand, the branched light 15b propagates straight through the half mirror 21, is reflected by the half mirror 28 and then by the mirror 25, and reaches the sensor 24 after passing through the half mirror 28. A condenser lens 36 for condensing the branched light 15b and the diffused light 27 to the sensor 24 at this time is arranged near the sensor 24. Accordingly, the branched light 15b and the diffused light 27 are condensed as very small light spots on the sensor 24.

Here, the branched light 15b is incident on the sensor 24 by the setting of the optical system 26, and a light spot B1 of the branched light 15b is located substantially in the center of the sensor 24 as shown in FIG. 4B. At this time, the half mirror 28 is first adjusted to locate the light spot B1 in the center of the sensor. The sensor 24 is, for example, a light receiving element made of Si material and is divided into four light receiving surfaces 24a, 24b, 24c and 24d, wherein the signals received by the diagonally arranged light receiving surfaces are detected as a signal by terminals 29, 30 via wirings 29a, 29b, 30a and 30b. If the light spot B1 is located in the center of the sensor 24, a difference between photoelectrically converted signals obtained at the terminals 29, 30 is 0.

If the angle θB is a suitable value, the light spot B2 of the diffused light 27 can be similarly incident on the sensor 24 and the angle θB is read by being adjusted by the rotation of the mirror 19 to locate the light spot B2 in the center of the sensor 24. In this way, the position of the screen 17 can be detected only by reading the signals from the sensor 24. At this time, since the modulated light 13 reflected by the mirror 19 after passing through the half mirror 28 propagates in a reverse direction along the optical path of the diffused light 27, this modulated light 13 overlaps with the modulated light 13 reflected by the half mirror 21 on the screen 17.

Further, the distance L1 between the scanning unit 18 and the screen 17 can be calculated from a distance L2 between the mirror 19 and the half mirror 21 and two angles θA, θB. By utilizing this, it is possible to automatically calculate the distance L1 and to display an image on the screen 17. An image can be displayed on the screen 17 only by reading the signals from the sensor 27 even without calculating the distance L1.

The mirror 28 can have, for example, a dielectric multilayer film formed on one surface thereof to provide a nonreflecting coating so that transmittance is equal to or above 95% and reflectance is equal to or below 4%, whereby the modulated light 13 can be effectively branched into a plurality of branched lights 15.

Figure 5:
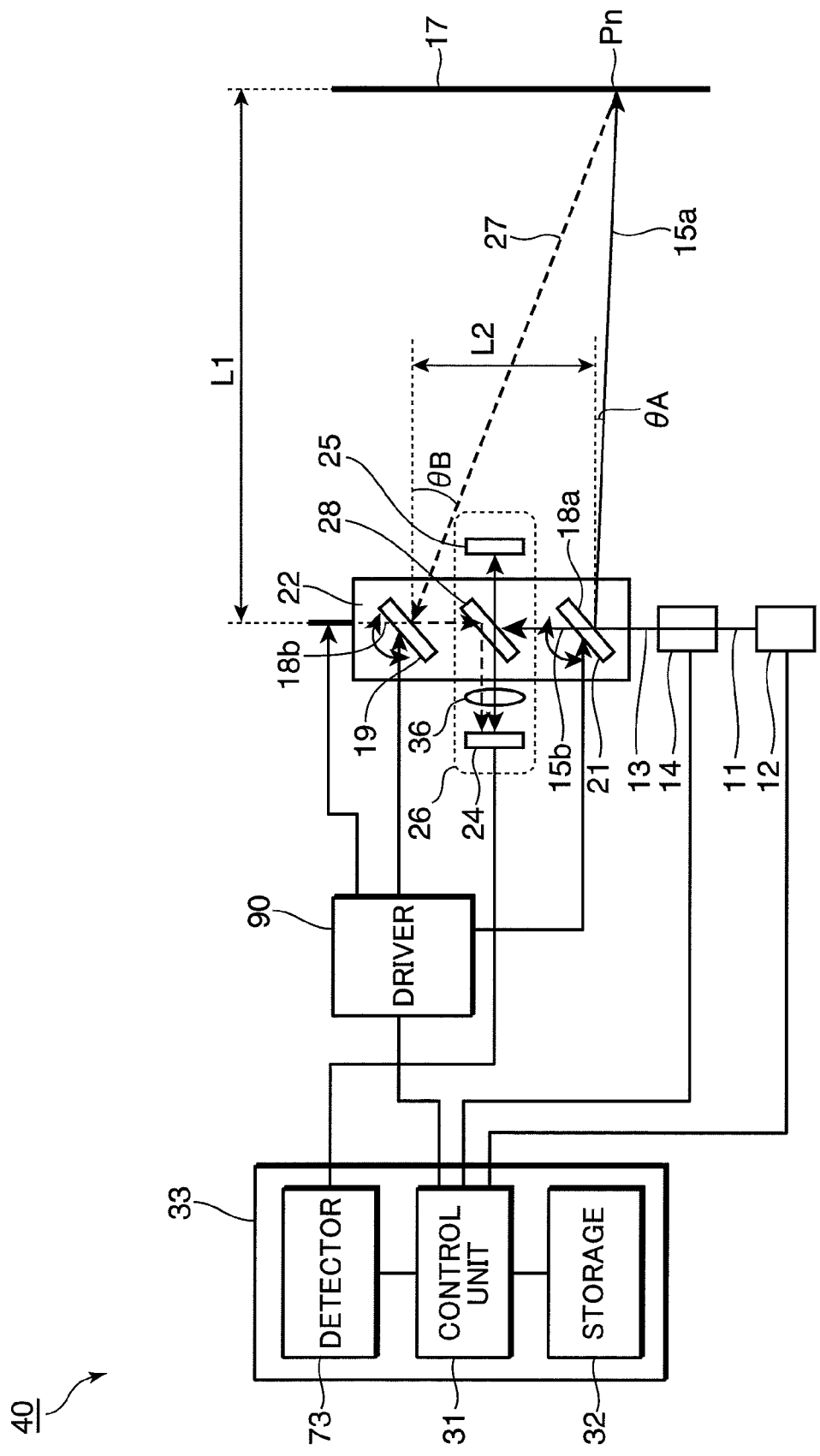
FIG. 5 is a schematic diagram of another laser display device according to the fourth embodiment of the invention when viewed from above.

FIG. 5 shows the construction of a laser display device 40 capable of displaying an image on the screen 17 by automatically calculating the distance L1 in this way. A controller 33 including a storage 32 and a detector 73 is further provided in addition to the construction of FIG. 4A. In the laser display device 40, the above control unit 31 is included in the controller 33.

As shown in FIG. 5, the laser display device 40 is provided with an optical system 26 for detecting the distance L1 between the scanning unit 18 and the screen 17 and the controller 33 including the detector 73 for detecting the distance L1 to the screen 17 in accordance with signals from the sensor 24 of the optical system 26, the storage 32 storing a table in which drive data of the first scanning unit 18a for scanning the first branched light 15a and the second scanning unit 18b for scanning the second branched light 15b in association with the first scanning unit 18a are set in correspondence with the distance L1 beforehand and the control unit 31 for controlling these in addition to the construction of the above first embodiment.

By storing data, which are changed by a set of the distance L1 and angles θA, θB, and the like in the storage 32 beforehand, it is possible to detect the position of the screen 17 and display an image instantaneously when a power switch of the laser display device 40 is turned on. Accordingly, this laser display device can be applied as a laser display device capable of dealing with an arbitrary screen position.

The laser display device 40 shown in FIG. 5 can display a bright image having speckle noise reliably reduced with the safety of eyes ensured similar to the laser display device 10 shown in FIG. 1A.

Fifth Embodiment

Figure 6:
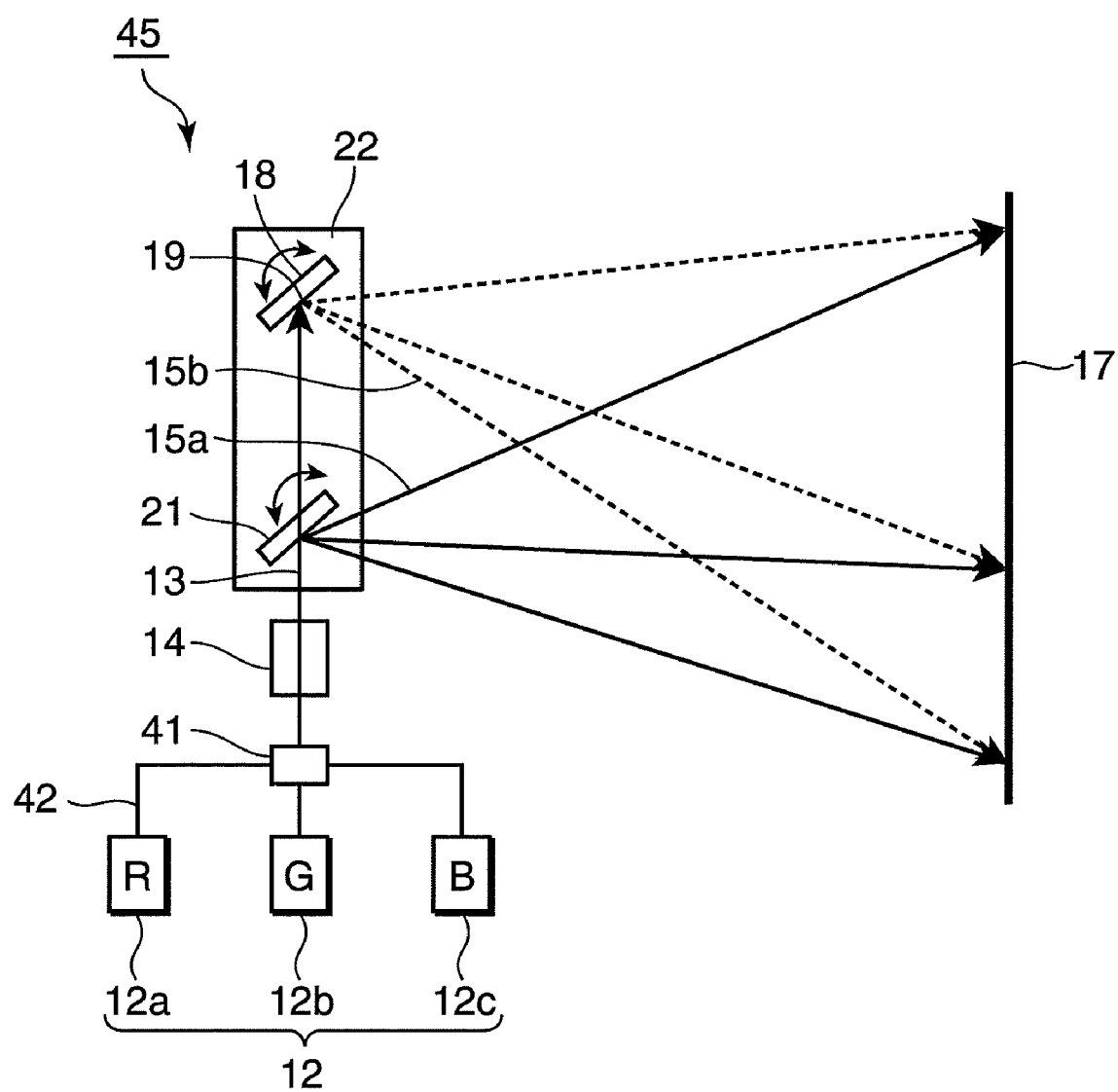
FIG. 6 is a schematic diagram of a laser display device according to a fifth embodiment of the invention when viewed from above.

Next, a fifth embodiment of the present invention is described. FIG. 6 is a schematic construction diagram of a laser display device according to the fifth embodiment of the present invention when viewed from above, and FIG. 7 is a schematic construction diagram of another laser display device according to the fifth embodiment of the present invention when viewed from above.

Figure 7:
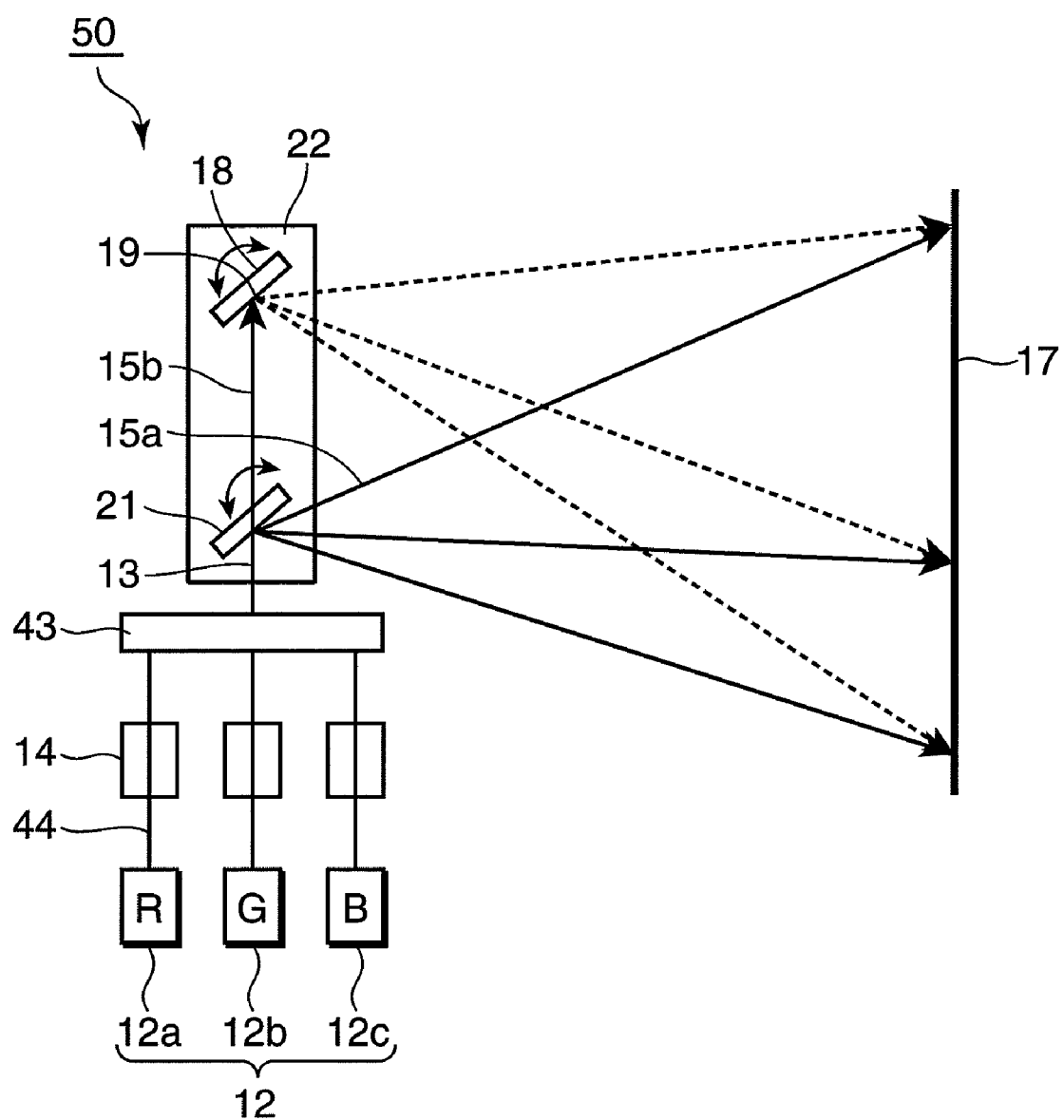
FIG. 7 is a schematic diagram of another laser display device according to the fifth embodiment of the invention when viewed from above.

Laser display devices 45, 50 according to this embodiment are such as to include at least a red light source (R light source) 12a, a green light source (G light source) 12b and a blue light source (B light source) 12c as laser light sources 12 in the laser display device 10 according to the above first embodiment as shown in FIGS. 6 and 7.

In the laser display device 45 shown in FIG. 6, R light, G light and Blight are respectively emitted from the R light source 12a, G light source 12b and B light source 12c, and the three lights are introduced to a light mixer 41 via optical fibers 42 and then emitted as a modulated light 13 from a modulator 14 to be used.

Similarly, in the laser display device 50 shown in FIG. 7, R light, G light and B light emitted as laser lights 44 from the respective R light source 12a, G light source 12b and B light source 12c are emitted as modulated lights from modulators 14, introduced to a light mixer 43 and then emitted as a modulated light 13 to be used. In other words, a plurality of modulators 14 for respectively modulating the R light, G light and B light and emitting the modulated lights are provided in FIG. 7.

Figure 8:
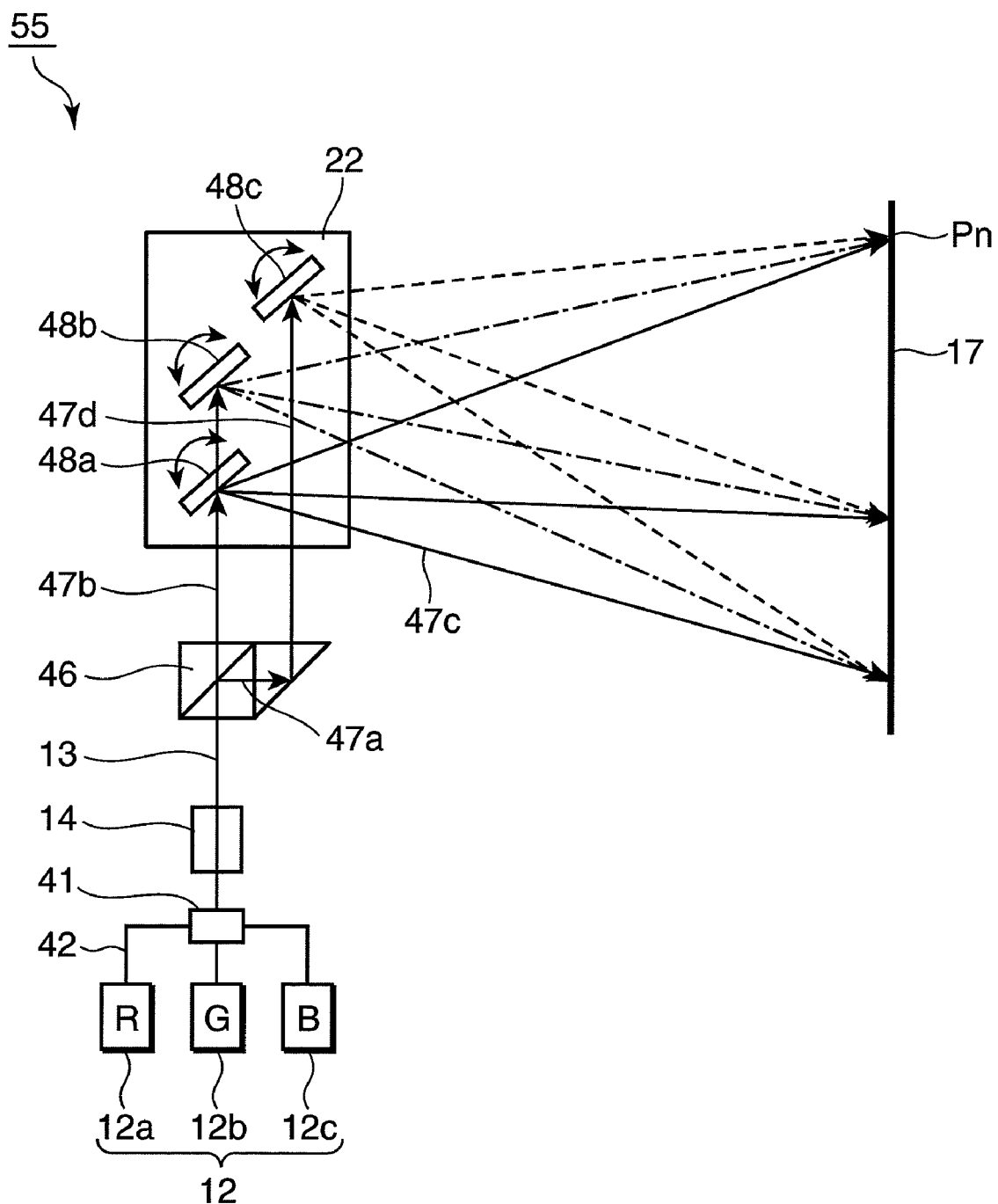
FIG. 8 is a schematic diagram of still another laser display device according to the fifth embodiment of the invention when viewed from above.

FIG. 8 is a schematic diagram showing still another laser display device according to the fifth embodiment of the present invention when viewed from above. In a laser display device 55 shown in FIG. 8, a modulated light is branched into a S-polarized first branched light 47a and a P-polarized second branched light 47b as branched lights 47 by a polarization beam splitter 46, and the second branched light 47b is further branched into a third branched light 47c and a fourth branched light 47d having half the light quantity of the second branched light 47b. At this time, three branched lights 47a, 47b and 47c reach the same display positions on the screen 17. These branched lights 47 are scanned in association with each other by three scanning units 48a, 48b and 48c. In this way, a plurality of branched lights 47 may include the first and second branched lights 47a, 47b as the S-polarized and P-polarized lights whose polarization directions are orthogonal to each other.

Here, effects described below can be obtained by causing the modulated light 13 to be incident on the polarization beam splitter 46 and branching it into the first and second branched lights 47a, 47b respectively including the S-polarized and P-polarized lights whose polarization directions are orthogonal to each other. In other words, the three scanning units 48a, 48b and 48c reflect the three branched lights 47a, 47b and 47c in directions toward the screen 17. Polarization directions of the respective branched lights 47a, 47b and 47c are specified upon being incident on mirrors of the respective scanning units 48a, 48b and 48c. Thus, by setting the characteristics of the mirrors of the respective scanning units 48a, 48b and 48c in conformity with the polarization directions of the incident branched lights, reflectances of the respective mirrors can be increased.

Any one of the laser display devices 45, 50 and 55 shown in FIGS. 6 to 8 can display a bright image having speckle noise reliably reduced with the safety of eyes ensured.

This embodiment may be constructed such that a difference in the optical path lengths of arbitrary two of a plurality of branched lights from the respective branching units to the display position exceeds a coherence length of the respective branched lights. By employing such a construction, an image having speckle noise more reduced can be displayed.

Sixth Embodiment

Figure 9:
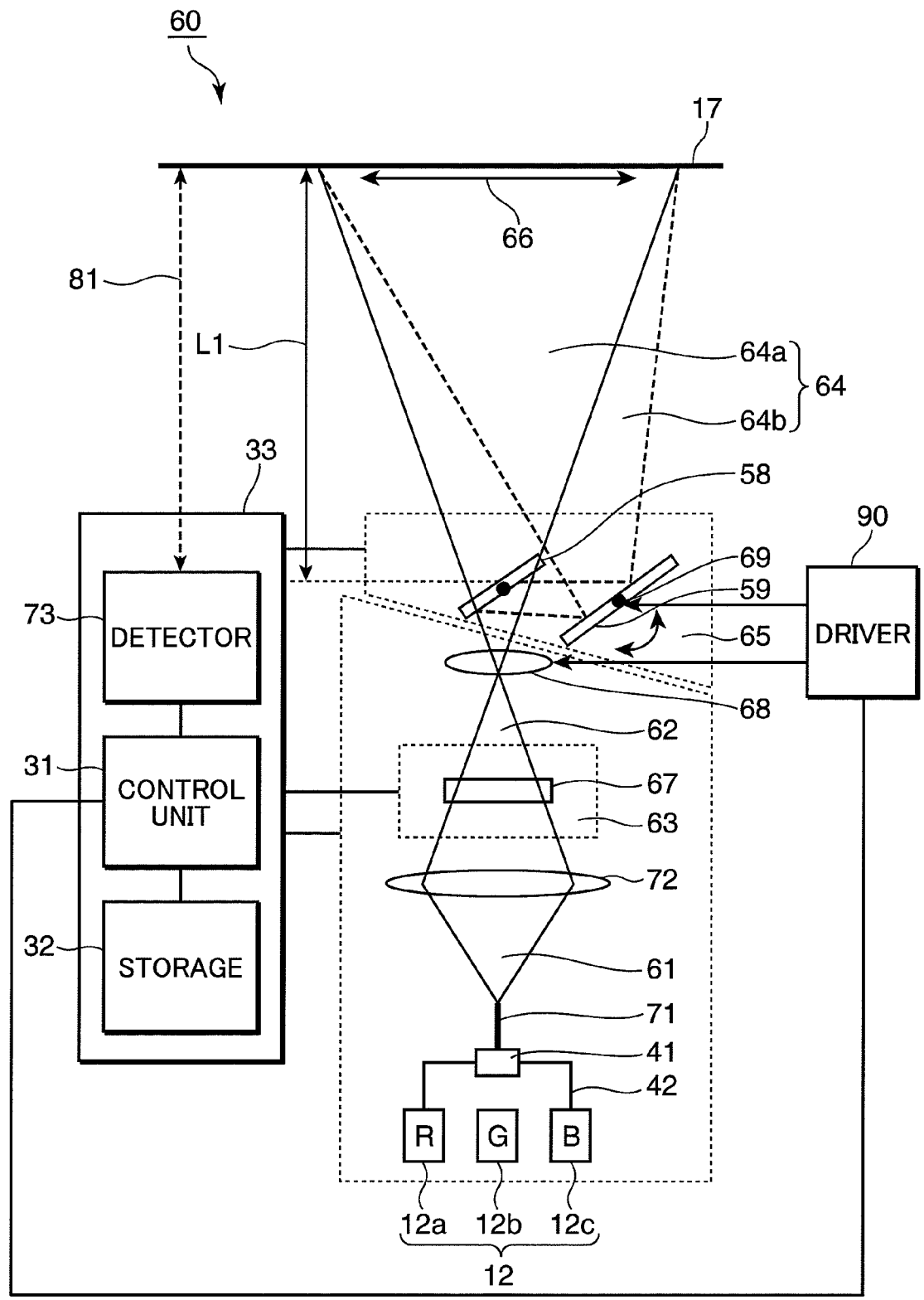
FIG. 9 is a schematic diagram of a laser display device according to a sixth embodiment of the invention when viewed from above.

Next, a sixth embodiment of the present invention is described. FIG. 9 is a schematic construction diagram of a laser display device according to the sixth embodiment of the present invention when viewed from above. Although the first to fifth embodiments relate to the scan type laser display devices for successively scanning the laser lights on the screen to display an image, this embodiment relates to a projection type laser display device for projecting and display an image on an entire screen by a two-dimensional spatial light modulation element.

A laser display device 60 according to this embodiment is provided with laser light sources 12 for emitting a laser light 61, a modulator 63 for modulating the laser light 61 and emitting a modulated light 62, a branching unit 65 for branching the modulated light 62 into a plurality of branched lights 64, and a projection lens 68 for focusing the respective branched lights 64 branched from the modulated light 62 on a screen 17. At least two branched lights 64a, 64b of the plurality of branched lights 64 reach the same display location 66 on the screen 17 at the same timing to display an image. The modulator 63 includes at least a two-dimensional spatial modulation element 67.

A half mirror 58 and a mirror 59 are arranged in the branching unit 65 of this embodiment, and the mirror 59 is rotated by a rotating unit 69. In other words, the angle of the mirror 59 is initially adjusted when a distance L1 to the screen 17 changes. Specifically, the movement of the projection lens 68 and the rotation of the mirror 59 by the rotating unit 69 are both carried out in accordance with commands from a driver 90. When the distance L1 to the screen 17 changes, the driver 90 gives a command to move the projection lens 68, whereby the projection lens 68 is moved relative to the screen 17 in a vertical direction to focus an image displayed on the screen 17. Further, the driver 90 gives a command to rotate the mirror 59 to the rotating unit 69 of the mirror 59 in accordance with the command to move the projection lens 68. An angle of rotation of the mirror 59 is determined according to a movement amount of the projection lens 68. By doing so, the focusing and positioning of the image displayed on the screen 17 can be simultaneously carried out when the distance L1 to the screen 17 changes.

As shown in FIG. 9, the laser light sources 12 of this embodiment include a red light source (R light source) 12a, a green light source (G light source) 12b and a blue light source (B light source) 12c, and R light, G light and B light emitted from the respective light sources are introduced to a light mixer 41 via optical fibers 42 and emitted as the laser light 61 from an optical fiber 71. The laser light 61 is introduced to the two-dimensional spatial modulation element 67 via a condenser lens 72 to be modulated by an image signal.

Since the laser light 61 reaches a display location 66 on the screen 17 after being branched in the laser display device 60 according to this embodiment, the light quantities of the plurality of branched lights 64 are respectively reduced to such intensities safe even upon being incident on eyes. However, at the respective positions of the display location 66, the light quantity of the modulated light 62 before being branched is finally collected although being once divided. Accordingly, a sufficient brightness can be ensured without reducing the light quantity at the respective positions of the display location 66. Since the plurality of branched lights 64 are collected at the respective positions of the display location 66, it is also possible to reduce speckle noise. Although the modulated light 62 has a high light intensity immediately after being emitted from the projection lens 68, it is branched by the half mirror 58 so that the branched lights 64a, 64b are not simultaneously incident on user's eyes in a region with a high light intensity (immediately after emission from the projection lens 68), whereby the safety of eyes is ensured.

Further, the laser display device 60 according to this embodiment is provided with the controller 33 including the detector 73 for detecting the distance L1 to the screen 17 and the storage 32 storing the table in which the rotation angle data by the rotating unit 69 of the mirror 59 for reflecting the second branched light 64b is set in correspondence with the distance L1 beforehand. The above control unit 31 is also included in the controller 33. Based on these data and table, the respective parts and data of the laser display device 60 are controlled by the control unit 31 of the controller 33.

The distance L1 can be measured by incorporating an optical detector comprised of a light emitting diode and a light receiving element into the detector 73 as shown in FIG. 9 and using a distance measurement light 81 which reciprocates between the detector 73 and the screen 17.

According to the laser display device 60 of this embodiment, a bright image having speckle noise reliably reduced can be displayed with the safety of eyes ensured.

Seventh Embodiment

Figure 10:
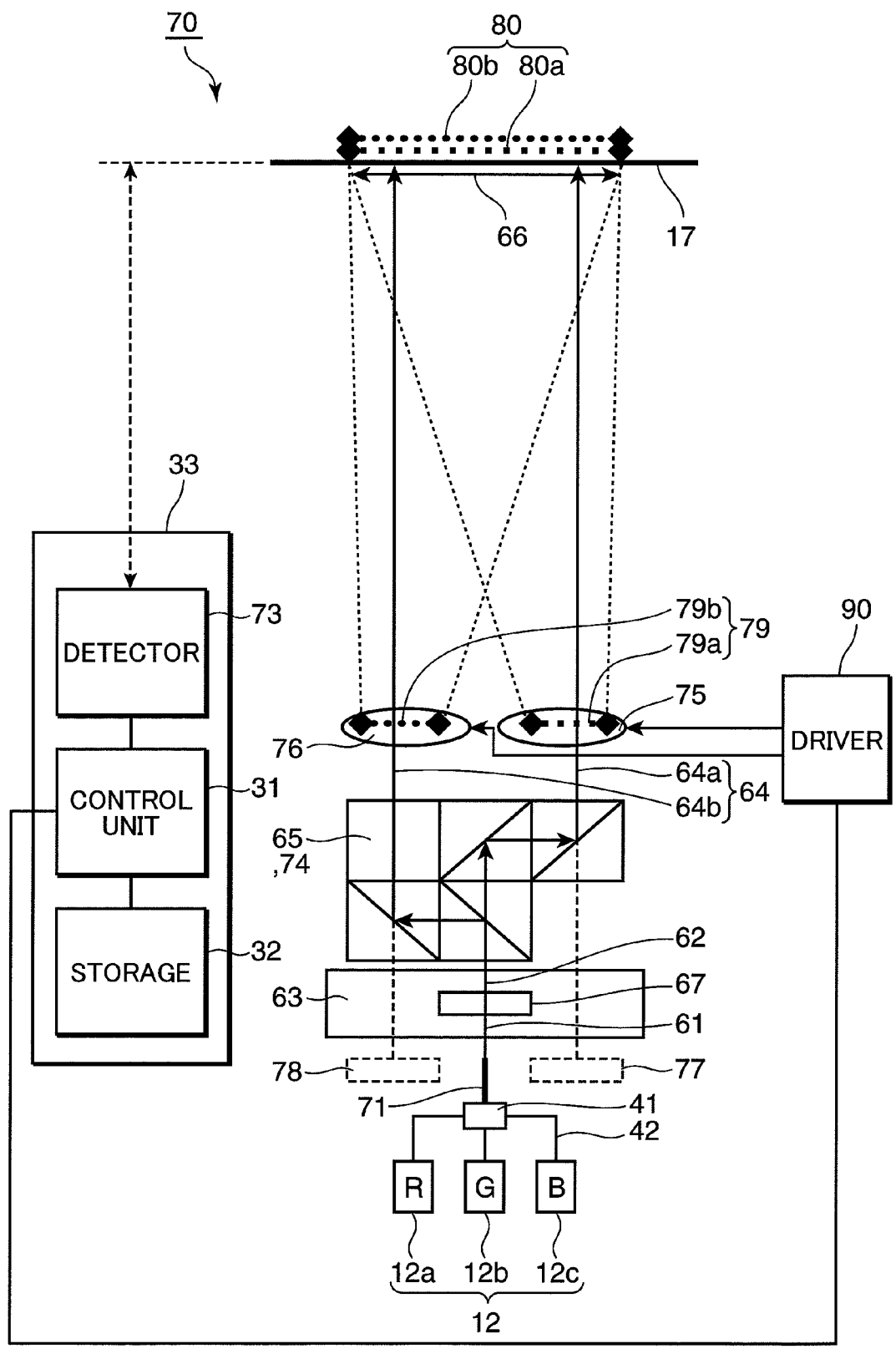
FIG. 10 is a schematic diagram of a laser display device according to a seventh embodiment of the invention when viewed from above.

Next, a seventh embodiment of the present invention is described. FIG. 10 is a schematic construction diagram of a laser display device according to the seventh embodiment of the present invention when viewed from above. This embodiment relates to a projection type laser display device for projecting and displaying an image on an entire screen by a two-dimensional spatial light modulation element similar to the sixth embodiment.

A laser display device 70 according to this embodiment is, as shown in FIG. 10, provided with laser light sources 12 for emitting a laser light 61, a modulator 63 for modulating the laser light 61 and emitting a modulated light 62, and a branching unit 65 (optical block 74) for branching the modulated light 62 into a plurality of branched lights 64. At least two branched lights 64a, 64b of the plurality of branched lights 64 reach the same display location 66 on a screen 17 at the same timing to display an image. In this embodiment, the branching unit 65 is constructed by the optical block 74 combined with a reflection mirror.

In the laser display device 70 according to this embodiment, the modulator 63 includes at least a two-dimensional spatial modulation element 67. The branching unit 65 is constructed by the optical block 74 for branching the modulated light 62 at least into two branched lights 64a, 64b as described above, and a plurality of projection lenses 75, 76 for respectively focusing the branched lights 64 on the screen 17 are further provided. The two branched lights 64 are the first branched light 64a and the second branched light 64b, which are projected to the same display location 66 on the screen 17.

As shown in FIG. 10, the laser light sources 12 of this embodiment include a red light source (R light source) 12a, a green light source (G light source) 12b and a blue light source (B light source) 12c and R light, G light and B light emitted from the respective light sources are introduced to a light mixer 41 via optical fibers 42 and are emitted as the laser light 61 from an optical fiber 71. The laser light 61 is introduced to the two-dimensional spatial modulation element 67 to be modulated by an image signal. The modulated light 62 is incident on the optical block 74 and emitted therefrom after being branched into the first and second branched lights 64a, 64b. The first and second branched lights 64a, 64b propagate as two-dimensional images 79a, 79b through the projection lenses 75, 76 and are projected as enlarged two-dimensional images 80a, 80b on the screen 17. At this time, the two-dimensional images 80a, 80b are projected on the screen 17 with the positions of the respective pixels superimposed on each other. In other words, the two-dimensional spatial modulation element 67 serves as two left and right apparent two-dimensional spatial modulation elements 77, 78 and it looks as if two-dimensional images of these apparent two-dimensional spatial modulation elements 77, 78 would propagate straight to be projected on the screen 17 to become the two-dimensional images 80a, 80b.

In the laser display device 70 according to this embodiment, the two two-dimensional images 80a, 80b are superimposed on the screen 17 by adjusting the positions of the projection lenses 75, 76. The projection lenses 75, 76 are constructed to have the positions thereof adjusted in accordance with a command from a driver 90 as shown in FIG. 10, and the position adjustments of the projection lenses 75, 76 are performed in association with each other by the driver 90, so that the superimposition of the two-dimensional images 80a, 80b on the screen 17 is quickly and precisely realized.

Since the laser light 61 reaches the display location 66 on the screen 17 after being branched in the laser display device 70 according to this embodiment, the light quantities of the plurality of branched lights 64 are respectively reduced to such intensities safe even upon being incident on eyes. However, at the respective positions of the display location 66, the light quantity of the modulated light 62 before being branched is finally collected although being once divided. Accordingly, a sufficient brightness can be ensured without reducing the light quantity at the respective pixel positions of the display location 66. Since the plurality of branched lights 64 are collected at the respective pixel positions of the display location 66, it is also possible to reduce speckle noise.

The plurality of projection lenses of this embodiment include the first projection lens 75 and the second projection lens 76, and the two-dimensional images 80a, 80b are superimposed by, out of the plurality of branched lights 64, displacing an optical axis of the first branched light 64a projected by the first projection lens 75 from an optical axis of the first projection lens 75 and displacing an optical axis of the second branched light 64b projected by the second projection lens 76 from an optical axis of the second projection lens. 76.

By employing such a construction, a bright image having speckle noise reduced can be more reliably displayed. By the displacement of the optical axes of the branched lights and those of the projection lenses, images projected on the screen 17 are intentionally displaced by about ¼ of the pixel pitch. By this, an effect of eliminating a lattice pattern between liquid crystal cells, which is problematic, for example, in a liquid crystal projector and the like, is exhibited, whereby a clearer image with high luminance can be obtained.

In the above sixth and seventh embodiments, angles formed by arbitrary two of the plurality of branched lights at the display positions these branched lights reach may be set equal to or larger than 1.5 milliradians and smaller than π radian similar to the above first embodiment. By adopting such a construction, even if a plurality of branched lights 15 are incident on the pupil of the eye 23, it can be avoided that the plurality of branched lights 15 are focused on one point on the retina of the eye, wherefore the safety of eyes can be more reliably ensured.

In the above sixth and seventh embodiments, the light quantities of the respective branched lights incident on eyes located near the projection lenses are preferably suppressed to below 66 mW.

The above sixth and seventh embodiments may be constructed such that a difference in the optical path lengths of arbitrary two of a plurality of branched lights from the respective branching units to the display location exceeds a coherence length of the respective branched lights. By employing such a construction, a bright image having speckle noise reduced can be more reliably displayed.

In the above sixth and seventh embodiments, polarization directions of the first and second branched lights may be orthogonal to each other. By employing such a construction, a bright image having speckle noise reduced can be more reliably displayed.

The above sixth and seventh embodiments may include light sources for respectively emitting at least red light, green light and blue light as laser light sources and a plurality of modulators for modulating the red, green and blue lights and emitting modulated lights. By employing such a construction, a high-luminance laser display device with a wide color reproduction range can be realized.

The present invention is summarized as follows from the above respective embodiments. Specifically, a laser display device according to one aspect of the present invention comprises a laser light source for emitting a laser light; a modulator for modulating the laser light emitted from the laser light source and emitting a modulated light; a branching unit for branching the modulated light emitted from the modulator into at least two branched lights; and an optical path setting unit for setting optical paths of the at least two branched lights so that the at least two branched lights propagate toward a screen, wherein the optical path setting unit causes the at least two branched lights to reach substantially the same positions on the screen substantially at the same timings.

In the above laser display device, a modulated light emitted from the modulator is branched into at least two branched lights, the optical paths of the at least two branched lights are set such that the at least two branched lights propagate toward the screen, and the at least two branched lights reach substantially the same positions on the screen substantially at the same timings. Thus, an image having speckle noise reduced can be displayed on the screen arranged at an arbitrary position. Further, since optical axes of the branched lights differ from each other, the safety of eyes can be more reliably ensured regardless of at which position in an emission direction of the laser light the laser light is seen.

Respective light quantities of the at least two branched lights are preferably equal to or below such a level as not to give any effect on the retinas of user's eyes when the respective branched lights are incident on the eyes of the user of the laser display device.

In this case, even if the branched lights are incident on the user's eyes, the safety of the eyes can be more reliably ensured.

It is preferable that the at least two branched lights include a first branched light and a second branched light; and that the optical path setting unit includes a first scanning unit for scanning the first branched light and a second scanning unit for scanning the second branched light and causes the first and second branched lights to reach substantially the same positions on the screen substantially at the same timings by associating the scanning of the first branched light by the first scanning unit and that of the second branched light by the second scanning unit.

In this case, since the first and second branched lights are more reliably scanned at the same display positions on the screen while being associated with each other, a bright image having speckle noise reliably reduced can be displayed with the safety of eyes ensured.

It is preferable that a sensor for detecting the laser light and an optical system for introducing either one of the first and second branched lights and a diffused light produced by diffusing the other branched light on the screen to the sensor are further provided; and that the first and second branched lights are caused to reach substantially the same positions on the screen substantially at the same timings based on a detection result from the sensor.

In this case, a bright image having speckle noise reduced can be more reliably displayed by automatically detecting the position of the screen and more reliably scanning a plurality of branched lights substantially at the same positions on the screen.

It is preferable that a sensor for detecting the laser light, an optical system for introducing either one of the first and second branched lights and a diffused light produced by diffusing the other branched light on the screen to the sensor and a detector for detecting the position of the screen based on a detection result from the sensor are further provided; and that the optical path setting unit causes the first and second branched lights to reach substantially the same positions on the screen substantially at the same timings based on the position of the screen detected by the detector.

In this case, a bright image having speckle noise reduced can be more reliably displayed by automatically detecting the position of the screen and more reliably scanning a plurality of branched lights substantially at the same positions on the screen.

It is preferable to further comprise a storage storing data setting the association of the scanning of the first branched light by the first scanning unit and that of the second branched light by the second scanning unit in correspondence with the screen position beforehand.

In this case, a bright image having speckle noise reduced can be more reliably displayed by automatically detecting a distance to the screen and quickly and reliably scanning a plurality of branched lights substantially at the same positions on the screen using a preset table.

It is preferable that a projection lens for focusing the modulated light emitted from the modulator on the screen is further provided; that the modulator includes a two-dimensional spatial light modulation element; that the at least two branched lights include a first branched light and a second branched light; the optical path setting unit includes a first mirror for causing the first branched light to propagate toward the screen and a second mirror for causing the second branched light to propagate toward the screen and causes the first and second branched lights to reach substantially the same positions on the screen substantially at the same timings by associating a propagation direction of the first branched light by the first mirror and that of the second branched light by the second mirror.

In this case, the branched lights modulated by the two-dimensional spatial light modulation element can display an image having speckle noise reduced on the screen arranged at an arbitrary position, and the safety of eyes can be more reliably ensured regardless of at which position in the propagation direction of the laser light the laser light is seen.

It is preferable to further comprise a detector for detecting the position of the screen and a storage storing data setting the association of the propagation direction of the first branched light by the first mirror and that of the second branched light by the second mirror in correspondence with the screen position beforehand.

In this case, a bright image having speckle noise reduced can be more reliably displayed by automatically detecting the position of the screen and more reliably scanning a plurality of branched lights substantially at the same positions on the screen.

It is preferable that the at least two branched lights includes a first branched light and a second branched light; that the modulator includes a two-dimensional spatial light modulation element; the branching unit includes an optical block for branching the modulated light into the first and second branched lights; that a first projection lens for focusing the first branched light on the screen by emitting it toward the screen and a second projection lens for focusing the second branched light on the screen by emitting it toward the screen are further provided; that the optical path setting unit causes the first and second branched lights to reach substantially the same positions on the screen substantially at the same timings by associating an emission direction of the first branched light by the first projection lens and that of the second branched light by the second projection lens.

In this case, the branched lights branched by the optical block can display an image having speckle noise reduced on the screen arranged at an arbitrary position, and the safety of eyes can be more reliably ensured regardless of at which position in the emission direction of the laser light the laser light is seen.

It is preferable that an optical axis of the first branched light projected by the first projection lens is displaced from an optical axis of the first projection lens; and that an optical axis of the second branched light projected by the second projection lens is displaced from an optical axis of the second projection lens.

In this case, a bright image having speckle noise reduced can be more reliably displayed. By displacing the optical axes of the branched lights and those of the projection lenses, an effect of eliminating a lattice pattern between pixels is further exhibited, whereby a bright image with high luminance can be displayed.

An angle on the screen formed by an incident direction of the first branched light on the screen and that of the second branched light on the screen is preferably equal to or larger than 1.5 milliradians and smaller than $\pi$ radian.

In this case, even if a plurality of branched lights are incident on the eyes, it can be avoided that the plurality of branched lights are focused on one point on the retina of each eye, wherefore the safety of eyes can be more reliably ensured.

A difference in an optical path length of the first branched light from the branching unit to the screen and that of the second branched light from the branching unit to the screen is preferably set to exceed a coherence length between the first and second branched lights.

In this case, an image having speckle noise reduced can be more reliably displayed.

A polarization direction of the first branched light and that of the second branched light are preferably orthogonal to each other.

The laser light source includes light sources for respectively emitting red light, green light and blue light.

In this case, a high-luminance laser display device with a wide color reproduction range can be realized.

The modulator preferably includes a plurality of modulation elements for modulating the red, green and blue lights and emitting modulated lights of the red, green and blue lights.

In this case, a high-luminance laser display device with a wide color reproduction range can be realized.

INDUSTRIAL APPLICABILITY

Since using a high-luminance laser light source with a wide color reproduction range, a laser display device according to the present invention has a uniform luminance even over a large area, a wide color reproduction range, a high image quality and excellent safety. Therefore, it can be usefully applied in the field of displays such as large-size displays and high-luminance displays.

What is claimed is:

1. A laser display device comprising:
a laser light source for emitting a laser light;
a modulator for modulating the laser light emitted from the laser light source and emitting a modulated light;
a branching unit for branching the modulated light emitted from the modulator into at least two branched lights, such that the at least two branched lights are emitted from the branching unit; and
an optical path setting unit for setting optical paths of the at least two branched lights emitted from the branching unit, such that the emitted at least two branched lights propagate toward a screen,
wherein the optical path setting unit causes the emitted at least two branched lights to reach same positions on the screen at substantially same timings by way of different optical paths set by the optical path setting unit, and
wherein the optical path setting unit scans the emitted at least two branched lights on the screen to reach one of the same positions at substantially a same time and then to reach another of the same positions at substantially another same time.

2. The laser display device according to claim 1, wherein respective light quantities of the emitted at least two branched lights are equal to or below a level, so as not to give any effect on retinas of a user's eyes when the emitted at least two branched lights are incident on the eyes of the user of the laser display device.

3. The laser display device according to claim 1, wherein:
the emitted at least two branched lights include a first branched light and a second branched light; and
the optical path setting unit includes a first scanning unit for scanning the first branched light on the screen, includes a second scanning unit for scanning the second branched light on the screen, and causes the first branched light and the second branched light to reach the same positions on the screen at substantially the same timings by associating the scanning of the first branched light by the first scanning unit and the scanning of the second branched light by the second scanning unit.

4. The laser display device according to claim 3,
wherein the laser display device further comprises a sensor detecting one the first branched light and the second branched light, and detecting a diffused light formed by diffusing another of the first branched light and the second branched light, not detected by the sensor, on the screen, and
wherein the first branched light and the second branched light are caused to reach the same positions on the screen at substantially the same timings based on a result of the sensor detecting the one of the first branched light and the second branched light and the diffused light.

5. The laser display device according to claim 3, further comprising:
a sensor detecting one of the first branched light and the second branched light, and detecting a diffused light formed by diffusing another of the first branched light and the second branched light, not detected by the sensor, on the screen; and
a detector for detecting a position of the screen based on a result of the sensor detecting the one of the first branched light and the second branched light and the diffused light,
wherein the optical path setting unit causes the first branched light and the second branched light to reach the same positions on the screen at substantially the same timings based on the detected position of the screen.

6. The laser display device according to claim 3, further comprising a storage unit storing data setting the association of the scanning of the first branched light by the first scanning unit and the scanning of the second branched light by the second scanning unit in correspondence with a detected screen position.

7. The laser display device according to claim 1, further comprising a projection lens for focusing the modulated light emitted from the modulator on the screen, wherein:
the modulator includes a two-dimensional spatial light modulation element;
the emitted at least two branched lights include a first branched light and a second branched light; and
the optical path setting unit includes a first mirror for causing the first branched light to propagate toward the screen, includes a second mirror for causing the second branched light to propagate toward the screen, and causes the first branched light and the second branched light to reach the same positions on the screen at substantially the same timings by associating a propagation direction of the first branched light by the first mirror and a propagation direction of the second branched light by the second mirror.

8. The laser display device according to claim 7, further comprising a detector for detecting a position of the screen, and a storage unit storing data setting the association of the propagation direction of the first branched light by the first mirror and the propagation direction of the second branched light by the second mirror in correspondence with the detected screen position.

9. The laser display device according to claim 1, wherein:
the emitted at least two branched lights includes a first branched light and a second branched light;
the modulator includes a two-dimensional spatial light modulation element;
the branching unit includes an optical block for branching the modulated light into the first branched light and the second branched light;
the laser display device includes a first projection lens for focusing the first branched light on the screen by emitting the focused first branched light towards the screen and includes a second projection lens for focusing the second branched light on the screen by emitting the focused second branched light towards the screen; and
the optical path setting unit causes the first branched light and the second branched light to reach the same positions on the screen at substantially the same timings by associating an emission direction of the first branched light by the first projection lens and an emission direction of the second branched light by the second projection lens.

10. The laser display device according to claim 9, wherein:
an optical axis of the first branched light emitted from the branching unit is displaced from an optical axis of the first projection lens; and
an optical axis of the second branched light emitted from the branching unit is displaced from an optical axis of the second projection lens.

11. The laser display device according to claim 3, wherein an angle on the screen formed by an incident direction of the first branched light on the screen and an incident direction of the second branched light on the screen is equal to or larger than 1.5 milliradians and smaller than $\pi$ radian.

12. The laser display device according to claim 3, wherein a difference in an optical path length of the first branched light from the branching unit to the screen and an optical path length of the second branched light from the branching unit to the screen is set to exceed a coherence length between the first branched light and the second branched light.

13. The laser display device according to claim 3, wherein a polarization direction of the first branched light and a polarization direction of the second branched light are orthogonal.

14. The laser display device according to claim 1, wherein the laser light source includes light sources for respectively emitting red light, green light and blue light.

15. The laser display device according to claim 14, wherein the modulator includes a plurality of modulation elements for modulating the red light, the green light and the blue light and emitting the modulated red light, the modulated green light and the modulated blue light.

* * * * *